(12) United States Patent
Chase et al.

(10) Patent No.: US 9,233,755 B1
(45) Date of Patent: Jan. 12, 2016

(54) HIGHLY EFFICIENT SUPERSONIC LAMINAR FLOW WING STRUCTURE

(75) Inventors: James D. Chase, Reno, NV (US); Michael Henderson, Piedmont, SC (US); Sturdza Peter, Redwood City, CA (US)

(73) Assignee: Aerion Corporation, Reno, NV (US)

( * ) Notice: Subject to any disclaimer, the term of this patent is extended or adjusted under 35 U.S.C. 154(b) by 558 days.

(21) Appl. No.: 13/068,773

(22) Filed: May 18, 2011

Related U.S. Application Data

(63) Continuation-in-part of application No. 11/974,802, filed on Oct. 16, 2007, now Pat. No. 7,946,535.

(51) Int. Cl.
| | |
|---|---|
| *B64C 30/00* | (2006.01) |
| *B64C 7/00* | (2006.01) |
| *B64C 9/18* | (2006.01) |
| *B64C 3/10* | (2006.01) |
| *B64C 9/24* | (2006.01) |
| *B64C 1/26* | (2006.01) |
| *B64C 3/14* | (2006.01) |

(52) U.S. Cl.
CPC . *B64C 30/00* (2013.01); *B64C 1/26* (2013.01); *B64C 3/10* (2013.01); *B64C 7/00* (2013.01); *B64C 9/18* (2013.01); *B64C 9/24* (2013.01); *B64C 2003/146* (2013.01); *B64C 2003/148* (2013.01); *B64C 2003/149* (2013.01); *Y02T 50/12* (2013.01); *Y02T 50/32* (2013.01)

(58) Field of Classification Search
CPC ............ B64C 1/26; B64C 30/00; B64C 3/10; B64C 2003/146; B64C 2003/148; B64C 2003/149

USPC ...... 244/90 R, 90 A, 213, 215, 216, 217, 198, 244/199.1, 199.2, 199.3, 199.4, 200, 200.1, 244/201
See application file for complete search history.

(56) References Cited

U.S. PATENT DOCUMENTS

| | | | |
|---|---|---|---|
| 2,136,845 A | 11/1938 | Fenton | |
| 2,254,304 A * | 9/1941 | Miller | 244/216 |
| 2,344,945 A * | 3/1944 | Knox et al. | 244/217 |
| 2,456,906 A * | 12/1948 | Bechereau | 244/212 |
| 3,141,637 A * | 7/1964 | Dornier et al. | 244/215 |
| 3,478,989 A * | 11/1969 | Bielefeldt | 244/218 |
| 3,968,946 A * | 7/1976 | Cole | 244/214 |
| 4,146,200 A * | 3/1979 | Borzachillo | 244/225 |
| 4,267,990 A * | 5/1981 | Staudacher | 244/52 |
| 5,249,762 A * | 10/1993 | Skow | 244/199.1 |
| 5,255,881 A * | 10/1993 | Rao | 244/199.1 |
| 5,282,591 A * | 2/1994 | Walters et al. | 244/199.1 |
| 5,322,242 A | 6/1994 | Tracy | |
| 5,518,204 A | 5/1996 | Tracy | |
| 5,681,013 A | 10/1997 | Rudolph | |
| 5,897,076 A | 4/1999 | Tracy | |
| 6,089,502 A | 7/2000 | Herrick et al. | |
| 6,149,101 A | 11/2000 | Tracy | |
| 6,152,404 A * | 11/2000 | Flaig et al. | 244/199.1 |
| 6,935,592 B2 * | 8/2005 | Morgenstern et al. | 244/89 |
| 7,367,532 B2 * | 5/2008 | Libby | 244/216 |
| 7,520,470 B2 * | 4/2009 | Lucchesini et al. | 244/199.1 |
| 2014/0070056 A1 * | 3/2014 | Merlo et al. | 244/199.1 |

* cited by examiner

*Primary Examiner* — Timothy D Collins
*Assistant Examiner* — Michael Kreiner
(74) *Attorney, Agent, or Firm* — William W. Haefliger

(57) ABSTRACT

Improved supersonic laminar flow wing structure, on a supersonic aircraft, having strake extending forwardly of the wing inboard extent, and reversed fillet at strake junction with the wing leading edge. Plain and split flap structures may also be provided at each laminar flow wing.

5 Claims, 6 Drawing Sheets

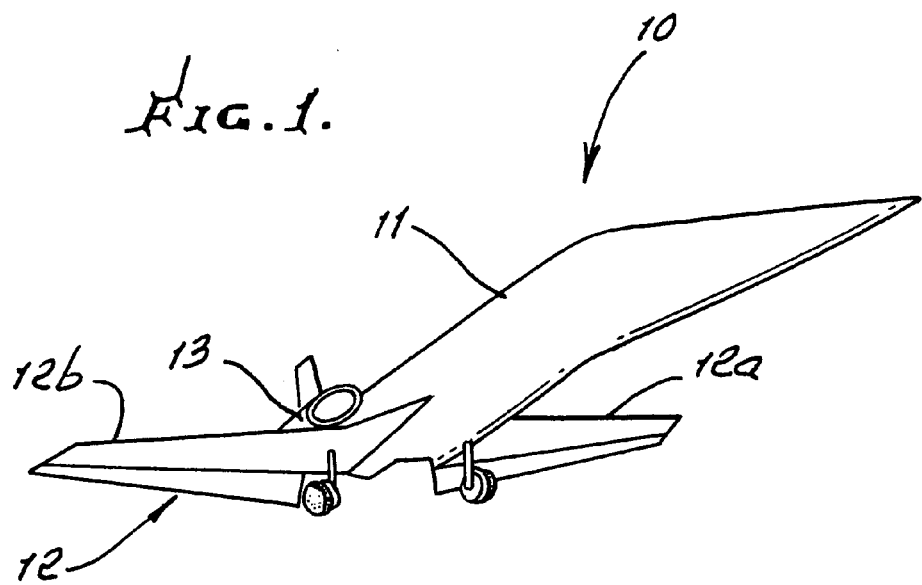
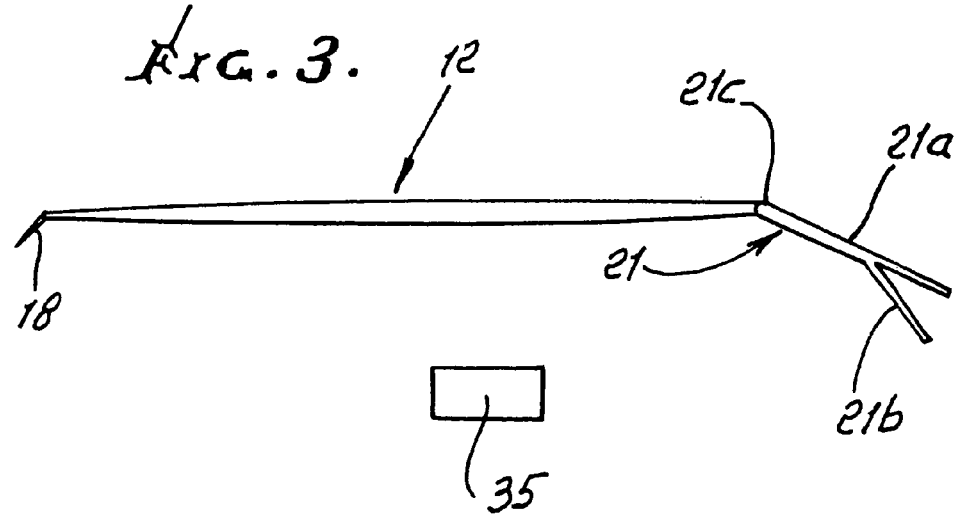

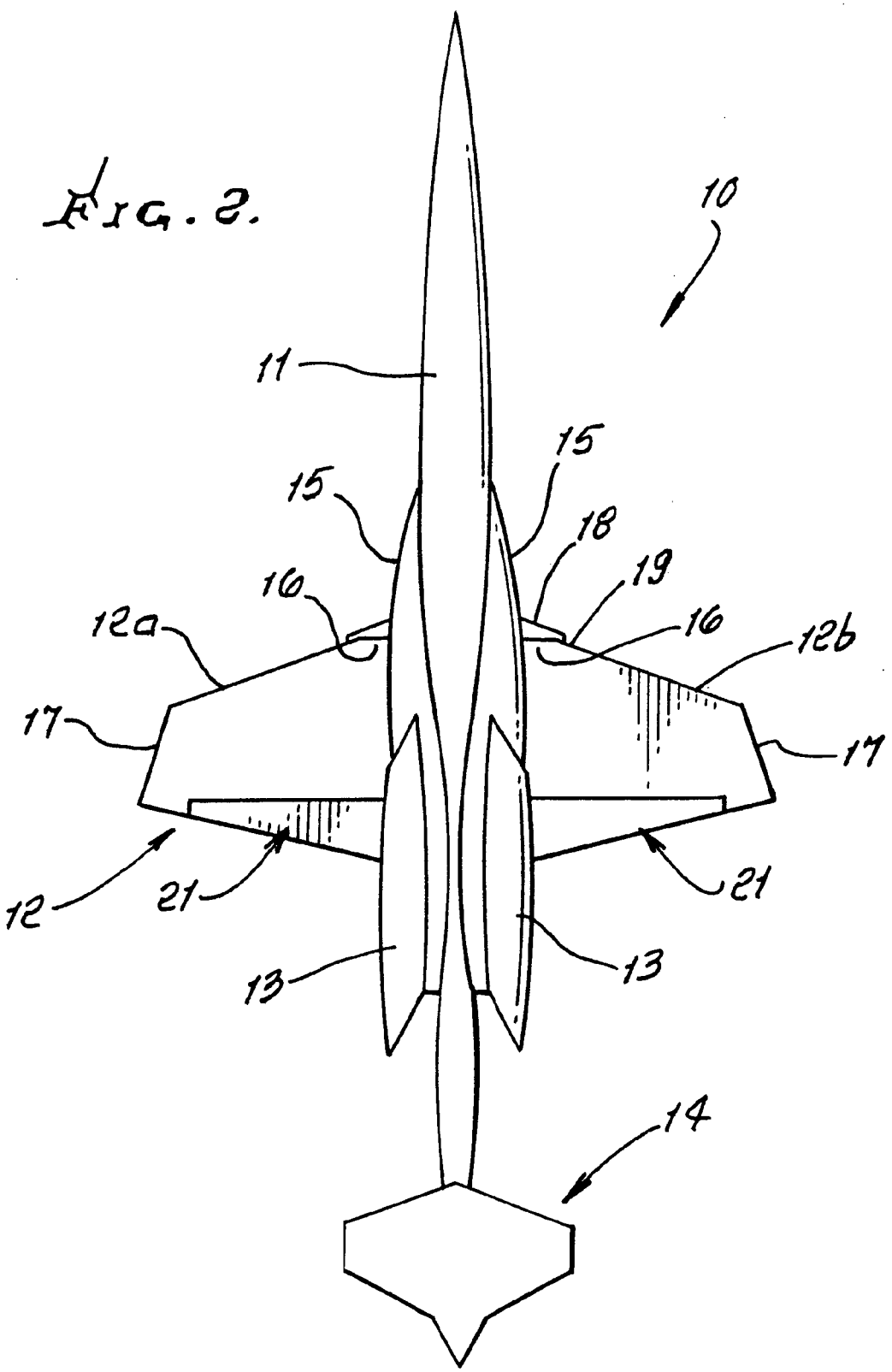

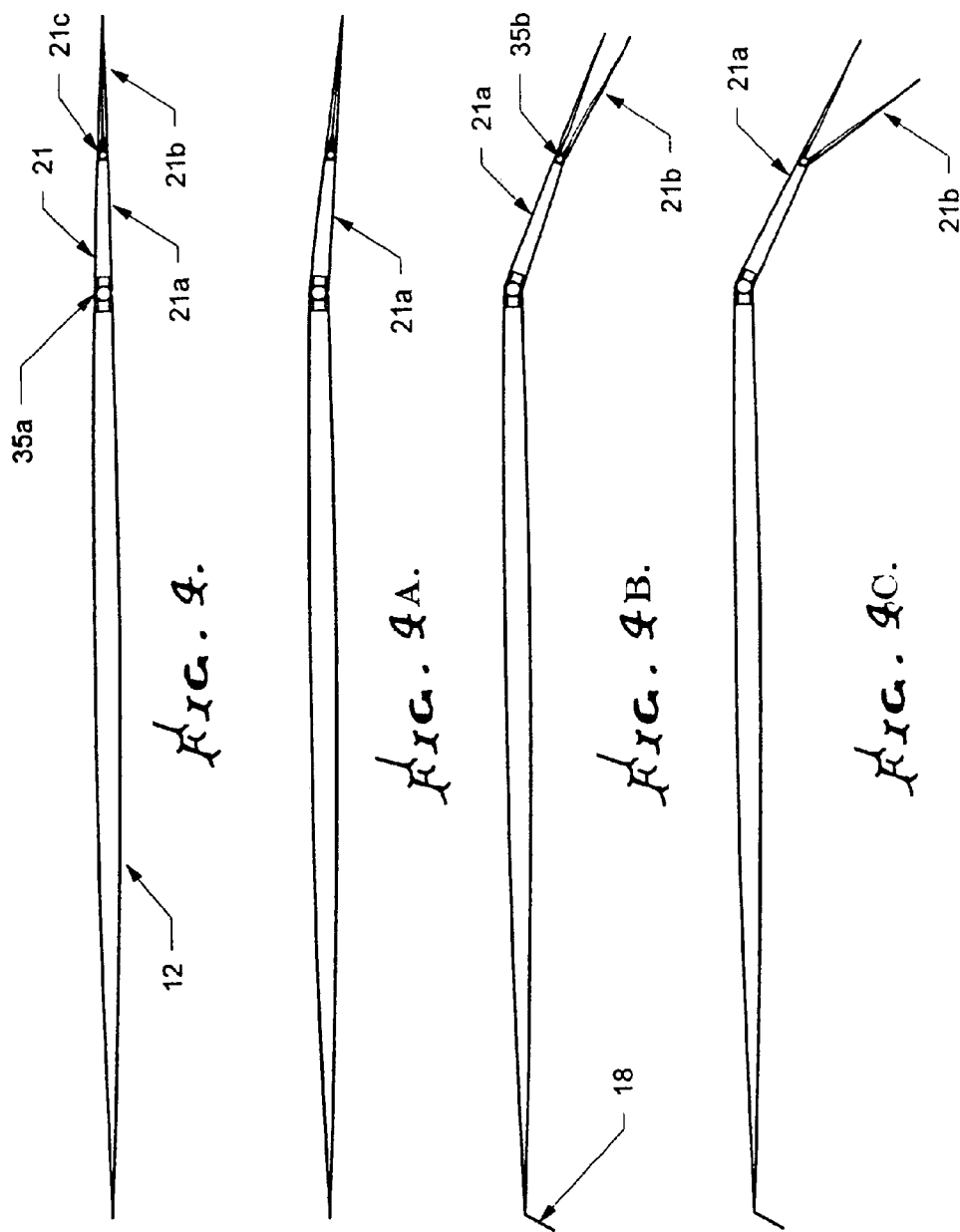

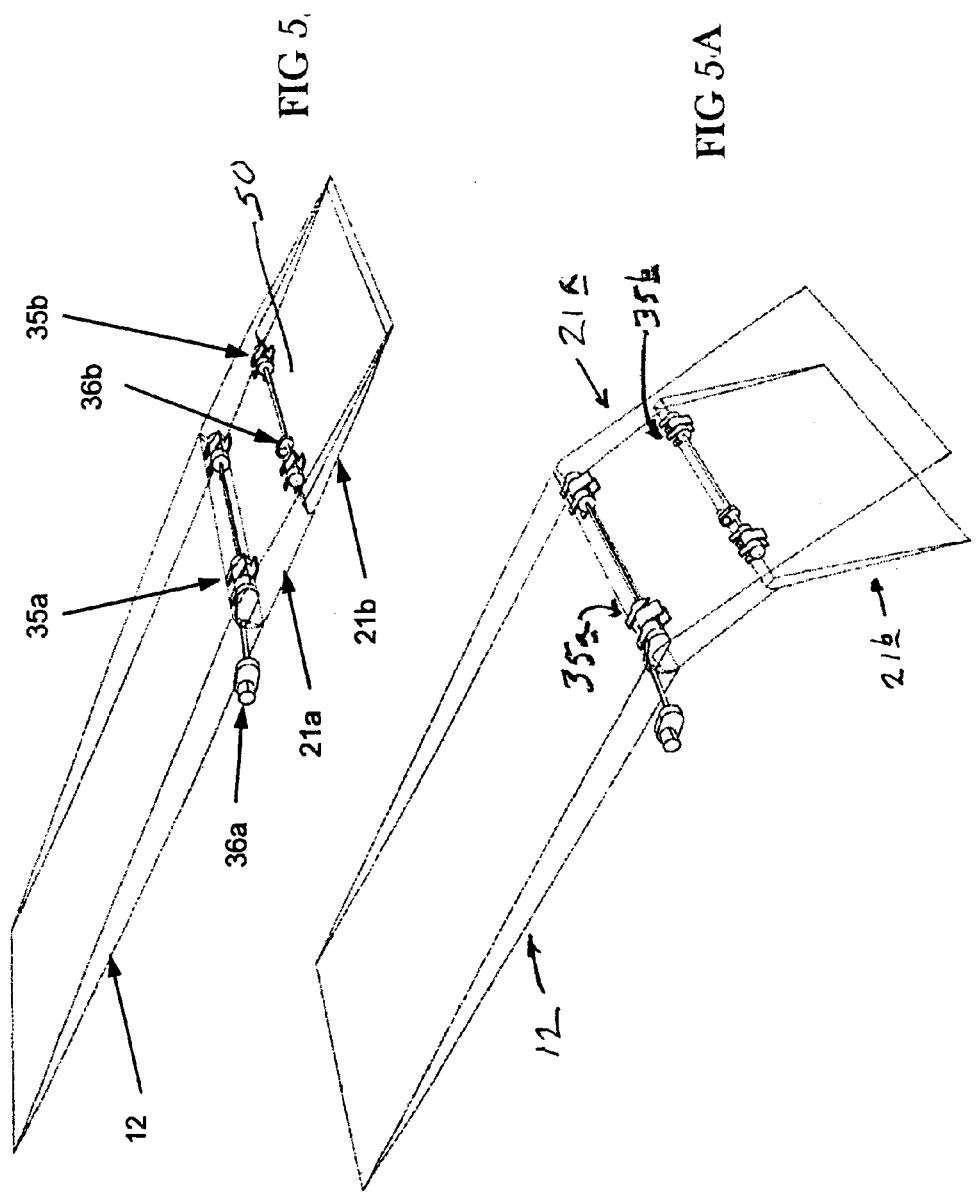

HIGHLY EFFICIENT SUPERSONIC LAMINAR FLOW WING STRUCTURE

This application is a continuation-in-part of U.S. Ser. No. 11/974,802 now U.S. Pat. No. 7,946,535, filed Oct. 16, 2007.

BACKGROUND OF THE INVENTION

This invention relates generally to efficient, supersonic, laminar flow aircraft wing configurations. More specifically it concerns improvements in the following configuration areas:
   a) strake,
   b) raked wing tip,
   c) reversed fillet wing-strake junction,
   d) inboard leading edge flap,
   e) hybrid plain-split flap.

Certain prior Richard Tracy patents disclose a laminar flow wing for efficient supersonic flight (U.S. Pat. No. 5,322,242, U.S. Pat. No. 5,518,204, U.S. Pat. No. 5,897,076 and U.S. Pat. No. 6,149,101). Recent developments have led to five areas of improvement, principally benefiting low speed characteristics of aircraft using the wing. The wing described in the prior Tracy patents has a sharp, modified biconvex airfoil, with less than about 30 degrees leading edge sweep in order to maintain an attached shock at supersonic cruise conditions, and thickness-chord ratio (t/c) of about 2% or less as a spanwise average over the majority of the wing. The latter excludes a zone near the inboard end, which may be thicker, up to about 4% t/c in combination with fuselage area ruling.

There are several unique characteristics of the supersonic laminar flow wing which pose challenges, especially in low speed flight. These include its sharp leading edge which causes a separation "bubble" at almost any angle of attack in subsonic flight, its extremely thin airfoil which imposes a structural weight penalty as aspect ratio is increased, and the un-swept leading edge which limits the effectiveness of "area ruling" the wing-body for minimizing supersonic wave drag. These (and other characteristics) are unique to the supersonic laminar wing and are substantially mitigated by the herein claimed improvements, acting individually or together, in combination with this type of wing.

SUMMARY OF THE INVENTION

Two of such improvements utilize features which have been used in aircraft design, but not in conjunction with the supersonic laminar flow wing under consideration. These are a "strake" and a "raked" tip. Three additional features are unique to the supersonic laminar wing. These are a "reverse fillet", a deployable flap at the inboard end of the leading edge, and a hybrid plain-split flap system. All five are described below.

Strake

The strake is a highly swept portion of the wing between the fuselage and the inboard end of the un-swept main wing panel. The strake's leading edge is preferably swept forward of the wing to an intersection with the fuselage, and its trailing edge may be a continuation of the outer wing trailing edge, or may be swept further aft to a fuselage intersection. The leading edge is preferably swept more than the Mach angle at the maximum supersonic cruise speed in order to have a "subsonic leading edge". This condition assures a detached shock wave and permits the leading edge of the strake to be somewhat blunt and cambered for less supersonic drag, and enhanced low speed lift capability of the wing, or its maximum "lift coefficient".

The strake performs several functions in addition to increasing maximum lift in the present application, while favorably affecting supersonic cruise performance. These are as follows: 1. Increases the span of the wing for improved lift efficiency with less structural weight penalty, 2. Improves the longitudinal distribution of fuselage and wing cross sectional area for lower supersonic wave drag, 3. Provides additional volume for fuel in the forward part of the aircraft, 4. Creates a vortex at moderate and high angles of attack in subsonic flight which tends to keep the flow attached over the upper inboard wing surface for better lift and engine inlet flow quality, 5. Helps maintain laminar flow over the inboard portion of the wing, and 6. Provides a structural hard point for landing gear mounting and space for gear retraction.

Raked Tip

The "raked tip" is a highly swept lateral edge, or wing tip, of the wing, which may have either a sharp or slightly blunted edge as long as it has more sweep than the Mach angle at the maximum cruise speed. The tip adds two important attributes to the type of wing under consideration.

It adds to the span and thus the aspect ratio without as much associated drag-causing wetted area and structural bending as would a conventional rounded or blunt tip. More importantly, in low speed flight it generates a "rolled up" vortex at up to moderate angles of attack, which remains attached to the upper surface of the wing tip. The attached tip vortex delays the growth of the leading edge separation bubble and resultant loss of lift over the outer portion of the wing. This, in turn, increases the maximum lift of the wing and prevents, or delays, the inboard movement of the tip vortex associated with loss of outer wing lift. The result is a lower downwash derivative with angle of attack over the horizontal tail, providing greater longitudinal stability and reduced tendency to pitch up.

Reversed Fillet

The wing-strake (or wing fuselage) junction on most aircraft is subject to detail treatment in form of a "fillet" or concave surface blending smoothly with the wing and fuselage surfaces. This fillet is generally associated with a concave curve in plan view between the leading edge and the fuselage.

For the laminar flow wing the necessity of avoiding excessive boundary layer cross-flow can be very difficult at the wing leading edge to strake (or fuselage) junction because the large up-wash at the junction causes Mach waves (pressure disturbances) and locally higher chord-wise pressure gradients on the wing surface. These effects can cause locally critical levels of boundary layer cross-flows, which can in turn destabilize the laminar flow over a substantial portion of the inner wing, resulting in a turbulent boundary layer and higher skin friction drag. However by making the leading edge profile convex at the strake (or fuselage) junction, so as to eliminate, or even slightly reverse, the sweep locally at the strake junction, cross-flows can be reduced to below critical levels and transition to turbulence substantially reduced.

Inboard Leading Edge Flap

A second consequence of the strong up-wash near the leading edge junction with the strake (or fuselage), in combination with the sharp leading edge is a premature growth of the leading edge separation "bubble" leading to early loss of lift over the inboard portion of the wing. This results in a delay of maximum lift to high angles of attack. Full span leading edge flaps can delay the formation and growth of the leading edge "bubble", but such devices are mechanically awkward with the very thin, sharp leading edge of the laminar wing, and are difficult, if not impossible, to implement without any surface gap or disturbance which would preclude laminar flow.

A more practical solution is a leading edge flap extending over only the inboard 15%, or so, of the wing panel span outboard of the strake or fuselage. Such a device, for example a Kruger flap extending forward of the leading edge, has been shown by proprietary tests to be very effective on this type of wing. It can be deployed from the strake (or fuselage) with a minimum of leading edge mechanization by various means, such as moving the flap laterally from a cavity in the strake (or fuselage), or by swinging it about a vertical pivot axis from a stowed position in the strake (or fuselage).

Hybrid Plain-Split Flap

The thin laminar flow wing is not suited to multi-element slotted flaps, slotted fowler flaps, or even "zap" flaps, because of lack of interior space and the undesirability of external hinges and tracks. For these reasons a plain hinged trailing edge flap is the most practical approach. However the lift increment which can be generated, especially with the sharp leading edge wing, is limited by separation of the flap upper surface.

A simple split flap (lower surface only deflected) has slightly higher maximum lift capability than a plain flap, but at a penalty in drag. In any case, a split flap would not be consistent with the need for small amounts of flap deflection for efficient subsonic and transonic cruise, which is required for most applications of the laminar supersonic wing.

For this type of wing a hybrid combination of split and plain flap offers unique advantages. The hybrid split flap is configured such that a portion of the flap lower surface can deflect down relative to the plain flap. The split flap hinge line can be co-located with the plain flap hinge, or preferably aft of it, near mid chord of the plain flap. When deflected, the split flap delays separation on the upper surface of the plain flap by lowering the wake pressure and reducing the adverse pressure gradient at the flap upper surface trailing edge. Since the outer portions of the plain flap are the most vulnerable to such separation, the split flap also mitigates tip stall and the increased downwash that would result as described in connection with the raked tip above.

DRAWING DESCRIPTION

FIG. 1 herein shows a supersonic aircraft wing, strake, flaps and leading edge flap;

FIG. 2 is a plan view of a supersonic wing, showing locations of the FIG. 3 flap structure;

FIG. 3 is a view of a supersonic wing showing, showing flap structure;

FIG. 4 is a view like FIG. 3, but showing actuators;

FIGS. 4a, 4b and 4c are views like FIG. 4, but showing different deflected positions of plain and split flaps;

FIG. 5 is a view of a representative rotary hinge flap actuator assembly;

FIG. 5a is like FIG. 5 except flaps are downwardly deployed;

DETAILED DESCRIPTION

Figure 6:
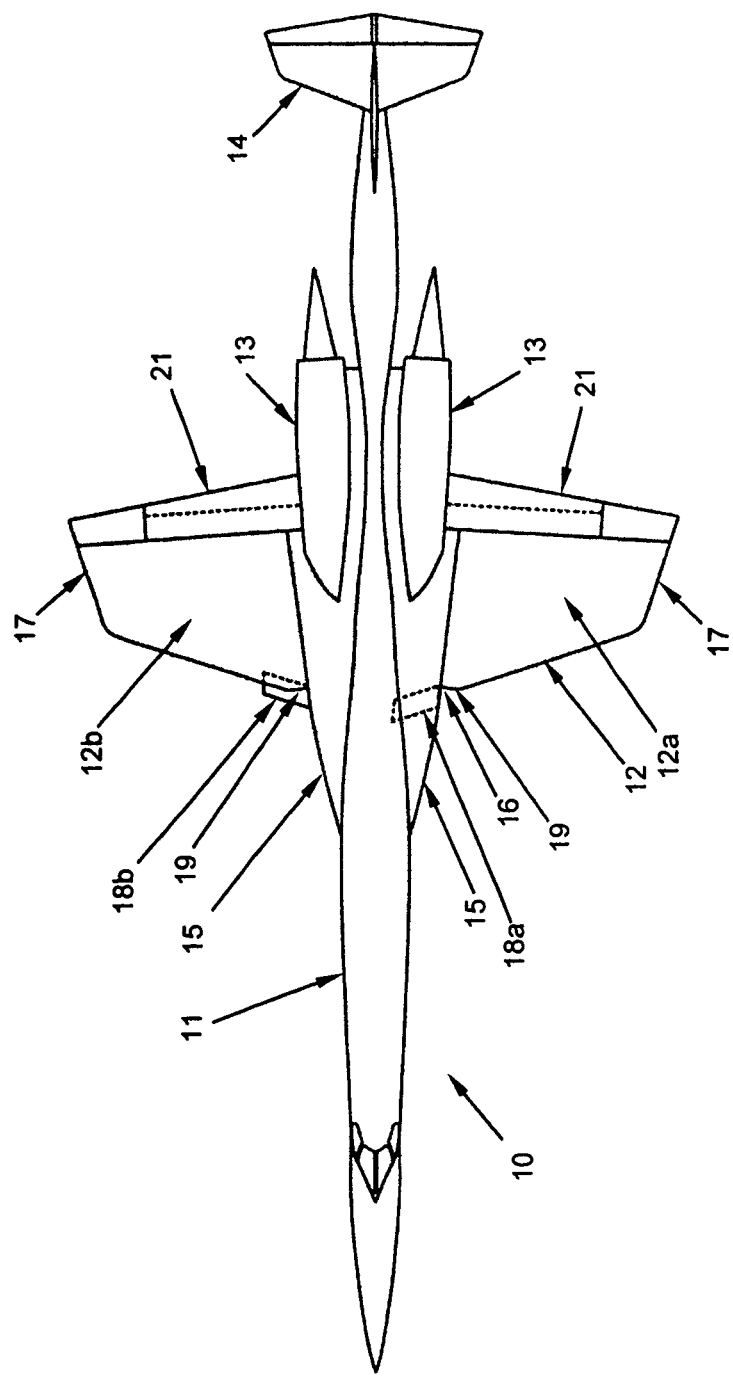
FIG. 6 is a view of a modified aircraft.

In the drawings, the preferred supersonic aircraft 10 has a fuselage 11, wing 12 including left and right wing sections 12a and 12b, jet engines 13 closely proximate opposite sides of the fuselage, and tail 14.

Strake is shown at 15, as a highly swept portion of the wing between the fuselage 11 and the inboard end 16 of the unswept main wing panel. Other strake characteristics are referred to above.

The raked tip of each wing section is shown at 17, and has characteristics as referred to above.

Reversed fillet configuration, for each strake-fuselage junction leading edge, is indicated at 119, and has characteristics as referred to above. See also FIGS. 6 and 7.

The inboard leading edge flap is shown, for each wing section, at 18, and has characteristics as referred to above, and may have association with cavities in the fuselage or strake.

Hybrid plain-split flap, for each wing section, is provided at 21, and has characteristics as referred to above, and includes plain flap 21a and split flap 21b. In the preferred embodiment rotary hinge actuators contained within the airfoil contour are employed, although conventional linear actuators combined with bell crank linkages could also be employed. Actuators for the plain flap 21a and split flap 21b are indicated at 35a and 35b respectively, and may have association cavities in the wing, fuselage or strake. The hinge line 21b is at 21c. In FIG. 3, the hinge line for the split flap may be co-located at or aft of 21c, with respect to plain flap 21a.

In FIG. 4, the typical supersonic cruise configuration is depicted with plain flap 21a and split flap 21b elements in their faired positions.

In FIG. 4A, a typical subsonic cruise position is depicted with plain flap 21a deflected through a small angle with split flap 21b undeflected and faired with respect to flap 21a. In FIG. 4B, a takeoff position is depicted with additional downward deflection of the plain flap 21a and a small deflection of the split flap element 21b relative to 21a. Leading edge flap 18 is showed deployed for this condition.

In FIG. 4C, a landing configuration is depicted with additional downward deflection of both plain flap element 21a and split flap element 21b.

FIGS. 5 and 5a show details of actuators 50 usable in FIGS. 4, 4A, 4B and 4C, and confined between planes defined by outer (uppermost and lowermost) surfaces of the planes and split flaps.

FIG. 5 illustrates a configuration of rotary geared actuators (RGA) to attach and deflect the hybrid flap system. The forward attaching ears of actuators 35a are connected to the structure of wing 12 and plain flap 21a is attached to the aft ears of 35a. The aft ears rotate relative to the forward ears via internal gearing of the 35a RGA, drive shafts, motor, and gearbox 36a effecting the deflection of flap 21a and split flap 21b which is attached to it. Similarly, the forward attaching ears of actuators 35b are connected to the structure of plain flap 21a and split flap 21b is attached to the aft ears of 35a. The aft ears rotate relative to the forward ears via drive shafts, motor, and gearbox 36b effecting the deflection of split flap 21b relative to 21a. This system allows for independent deflections of the split flap and plain flap segments. A system where split flap deflection is dependent on plain flap deflection may be effected by a single motor and interconnecting drive shafts and gear boxes. A system driven via linear actuators (such as hydraulic cylinder or jack screw) and bell crank linkages may be employed.

FIG. 5a illustrates the plain flap deflected relative to the wing, and the split flap deflected relative to the plain flap segment.

FIG. 5 also shows actuator position conformable to the flatness configuration of the plain and split flaps.

In the aircraft of FIG. 6, the inboard leading edge flap 18a is shown in the stowed (retracted) cruise position. Numeral 18b shows the right hand leading edge flap in extended position at the right hand (12*b*) wing section. Positions at 18*a* and 18*b* have characteristics as referred to above, and may have association with cavities in the fuselage or strake, as indicated. When the leading edge flap is extended, it projects in superposed relation to the angularly reversed fillet, for operation at lower speeds.

Figure 7:
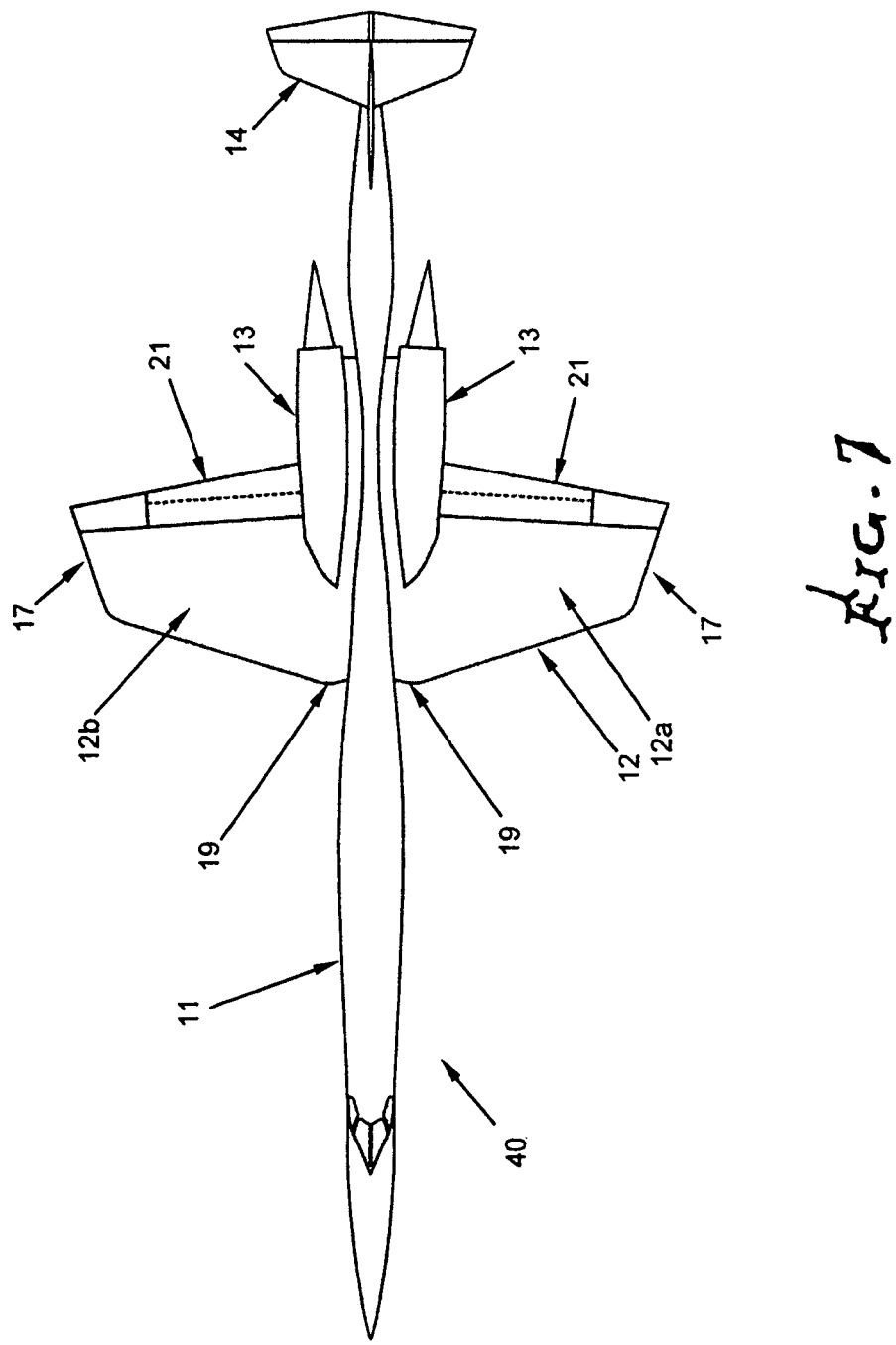
FIG. 7 is a plan view of a modified aircraft.

FIG. 7 illustrates the top view of an aircraft 40 without the strake element but incorporating the reverse fillet leading edge intersection 19 intersecting the side of the fuselage 11. The reverse fillet, leading edge extends angularly toward the fuselage, also longitudinally rearwardly.

What is claimed is:

1. Improved supersonic laminar flow wing structure, on a supersonic aircraft, the wing structure characterized as forwardly sharp, and thin along its chordal extent, and having in combination the following:
    a) a fuselage,
    b) reversed fillet at fuselage junction with the wing leading edge, said reversed fillet having a forward edge defining a first edge portion angled forwardly toward the fuselage and a second edge portion angled rearwardly toward the fuselage.

2. Improved supersonic laminar flow wing structure as defined in claim 1 wherein said reversed fillet has a convex leading edge profile at said junction between said two edge portions.

3. Improved high speed laminar flow wing structure, on an aircraft, having in combination the following:
    a) strake extending forwardly of the wing inboard extent,
    b) wing reversed fillet at strake junction with the wing leading edge,
    c) said strake having a highly swept, blunt leading edge, and providing fuel receiving space,
    d) said reversed fillet itself having a leading edge which is convex at a fillet junction with said strake,
    e) said reverse fillet leading edge defining a first edge portion angled forwardly toward the fuselage, and a second edge portion angled rearwardly toward the fuselage.

4. The combination of claim 3 wherein the wing has leading edge sweep of less than about 30°.

5. Improved high speed laminar flow wing structure, on an aircraft, having in combination the following:
    a) a wing reversed fillet at junction with the inboard end of wing leading edge,
    b) said reversed fillet itself having a leading edge which is convex at a fillet junction with said fuselage,
    c) said reversed fillet leading edge defining a first edge portion which is angled forwardly toward the fuselage, and a second edge portion angled rearwardly toward the fuselage.

* * * * *